United States Patent [19]

Silva et al.

[11] 4,209,889
[45] Jul. 1, 1980

[54] CORROSION RESISTANT FASTENING SYSTEM AND METHOD

[75] Inventors: Joseph W. Silva, Northford, Conn.; Albert J. Duffield, Johnson City, Tenn.

[73] Assignee: Olin Corporation, New Haven, Conn.

[21] Appl. No.: 881,320

[22] Filed: Feb. 27, 1978

[51] Int. Cl.$^2$ .................... B23P 11/00; A43B 23/20; E01B 9/06; F16B 15/00
[52] U.S. Cl. ........................... 29/432; 29/526 R; 85/10 E; 403/404
[58] Field of Search ............ 29/432, 526 R; 85/10 E, 85/32 K, 1 K, 32 UN; 227/9, 11; 403/404

[56] References Cited

U.S. PATENT DOCUMENTS

| | | | |
|---|---|---|---|
| 2,189,439 | 2/1940 | Temple | 227/9 X |
| 2,666,252 | 1/1954 | Temple | 85/10 E UX |
| 3,052,331 | 9/1962 | Bothwell | 403/404 |
| 3,618,445 | 11/1971 | Hartmann et al. | 85/10 E |

FOREIGN PATENT DOCUMENTS 1181139   5/1958   Fed. Rep. of Germany .......... 85/10 E

*Primary Examiner*—Charlie T. Moon
*Attorney, Agent, or Firm*—William W. Jones; Paul J. Lerner

[57] ABSTRACT

A corrosion resistant fastening system for use with metallic targets exposed to corrosive, aqueous environments, comprising a fastener and a planar coupon each formed of a corrosion resistant alloy. The fastener is driven through the coupon and into the target by means of a powder actuated tool, whereby the coupon is maintained in intimate contact with the target surface. Corrosion thus preferentially occurs at the interface between the target and the coupon, the interface between the target and the fastener being thereby protected.

10 Claims, 2 Drawing Figures

CORROSION RESISTANT FASTENING SYSTEM AND METHOD

BACKGROUND

The present invention relates to mechanical fasteners and, more particularly, to a corrosion resistant fastening system for use with a metallic target in a corrosive, aqueous environment.

The use of fasteners emplaced in a target by means of a powder actuated tool is well known in the art. Extensive commercial use testifies to the versatility and economy of the system. Indeed, the system permits fastenings to be made under conditions which would otherwise render such work very laborious, very costly, or impossible. For example, systems are commercially available which may be used by divers, working at depths of over 200 feet, to fasten objects to submarine steel or concrete structures.

Steel is the basic construction material in marine environments, generally in a conventional low carbon, non-alloyed form. Such steel has no resistance of itself to the previously mentioned corrosive environments. Commonly, therefore, protection against corrosion is sought by painting, coating, sheathing, or cathodically protecting with impressed electric current or sacrificial anodes made of zinc or aluminum, or by a combination of these means. While these measures, to a greater or lesser extent, protect the gross steel structure, they can be ineffective for the relatively small fastener which is driven into the structure. Such fasteners are frequently corroded to the point of uselessness within a year of installation; while, in order to be considered viable, a fastener must retain its integrity for a substantial period, generally about 10 years.

EXAMPLE 1

In an underwater marine application a steel "saddle" holding a sacrificial aluminum anode was fastened to a steel structure by means of powder driven carbon steel fasteners. Within a period of two years the carbon steel fasteners corroded to such an extent that the "saddle" fell from the structure. An analysis of the failure indicated that the fastener was in a "shadow" area in respect to cathodic protection and suffered crevice corrosion despite the nearness of the sacrificial anode.

In the example cited above, the fastener material was a medium carbon (about 0.6% C) non-alloyed steel. Such material is commonly used for powder-driven fasteners because it is the least costly material which can be treated to yield a hardness, on the Rockwell C scale, of at least 48. Long experience has demonstrated that a powder actuated fastener must have a hardness of at least RC48 and preferably RC50-55 to be capable of being driven into the steels and concretes used for construction.

Inasmuch as it is well known that the carbon steels are very susceptible to corrosion in the subject environments, it follows that the designer would seek fasteners made from materials which are known to be resistant to corrosion. The choice of such materials becomes somewhat restricted, however, by the need for the fastener to have the minimum hardness of Rockwell C48 cited above. Nonetheless such materials are known and available. These are generally "age-hardenable" alloys containing substantial nickel and chromium and are identified as specific stainless steels or Inconel alloys.

Fasteners made from corrosion resistant materials, i.e., selected stainless or Inconel alloys, perform as technically predicted when employed in concrete structures.

EXAMPLE 2

Corrosion resistant fasteners made from selected stainless steel and Inconel alloys were powder driven to affix cypress wood buffer strips to large concrete blocks. The blocks with affixed wood and fasteners were submerged in circulating sea water for a period of 10 years and were removed for examination at exposure periods of ½ year, 1 year, 2 years, and 10 years. The fasteners were found to be not corroded. The holding strength, as measured by the force required to pull the affixed fastener from the concrete, had not deteriorated and, indeed, had increased because the strength of the concrete itself had increased over the 10 year period of aging.

EXAMPLE 3

Onto the concrete blocks cited in the above Example 2 were affixed copper-nickel alloy coupons and "springs" designed to exert a constant tensile force on the affixing corrosion resistant fastener. The blocks were exposed and examined as described in the above Example 2. The fasteners were found to be not corroded and the holding strength had increased due to the aging of the concrete as described above.

However, when the corrosion resistant fasteners were employed to affix materials to steel structures, there occurred a phenomenon entirely different from that experienced with concrete structures.

EXAMPLE 4

Corrosion resistant fasteners made from selected stainless steel and Inconel alloys were powder driven to affix cypress wood buffer strips to large steel plates; these plates being low-carbon structural steel of the ASTM A-36 type. The steel plates with affixed wood and fasteners were exposed and examined as described in Example 2. The fasteners were found to be not corroded even after 10 years exposure. However, within a period of 1 year, the fastening had lost its integrity and there was no holding strength because the steel plate had corroded substantially at the interface between the target plate and the driven fastener.

SUMMARY OF THE INVENTION

The previously described limitations and shortcomings of the prior art fasteners are overcome by the present invention, comprising a metal fastener formed of a corrosion-resistant alloy and adapted to be driven by a powder actuated tool, and at least one planar metal coupon, formed of a corrosion resistant alloy, through which the fastener is driven. More specifically, the coupon is juxtaposed with the target and maintained in intimate contact therewith by means of the fastener passing therethrough.

We have discovered that the failure of fastenings, effected by driving a corrosion resistant fastener into a conventional carbon steel or similar target, is caused by corrosion of the target at the interface with the fastener. A powder driven fastener, in contrast to a bolt, is dependent entirely, for preservation of the holding power and fastening integrity, on the compressive forces exerted by the target structure on the body of the driven fastener. Hence, the preservation of the annular interfacial area between the body of the driven fastener and the surrounding target material is critical to the preservation of the fastening.

We have further discovered that this inevitable corrosion may be redirected by means of a suitable metal coupon disposed in intimate contact with the fastener and with the portion of the target immediately adjacent thereto. Corrosion thus preferentially occurs at the interface between the target and the coupon; the interface between the target and the fastener being thereby protected.

The coupon is formed of an alloy no more noble, in the galvanic series of the metals than the alloy of the fastener, but more noble than the alloy of the target.

EXAMPLE 5

Onto structural steel plates of the type cited in Example 4 were affixed copper-nickel alloy coupons and "springs" as cited in Example 3 using the powder driven corrosion resistant fasteners made from selected stainless steel and Inconel alloys. The steel plates with affixed members and fasteners were exposed and examined as in Example 2. The fasteners were found to be not corroded even after 10 years exposure. Further, in all instances where there existed an intimate contact between the coupon or spring and the target steel plate, there occurred no corrosion at the interface between the target plate and the driven fastener. The integrity of the fastening was maintained and the force required to pull the fastener from the target was the same as before exposure to the corrosive environment.

BRIEF DESCRIPTION OF THE DRAWING

The various features and advantages of the fastening system and method of the present invention will be more readily apparent from the following detailed description when considered in connection with the accompanying drawing wherein.

DESCRIPTION OF THE PREFERRED EMBODIMENT

Figure 1:
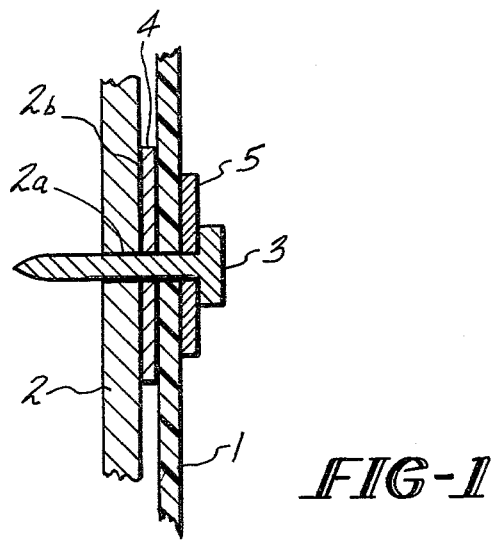
FIG. 1 is a fragmentary cross-sectional view of a fastener system arranged and constructed in accord with the present invention.

In FIG. 1, there is shown one embodiment of the fastening system, utilized to secure a layer of polymeric sheathing 1 to a steel target structure 2, comprising a fastener 3 and a planar coupon 4 through which the fastener 3 is driven.

The fastener 3 is formed of a corrosion resistant metal alloy, such as stainless steel or Inconel, selected to be age hardenable to a minimum hardness of Rockwell C48, and is adapted to be driven by means of a powder actuated tool of a type well known in the art. The fastener 3 pierces the coupon 4 and penetrates the structure 2, whereby the coupon 4 is maintained in intimate juxtaposed contact with the structure 2 and an intimate contact is also maintained between the coupon 4 and the fastener 3.

The coupon 4 is formed of an alloy selected from the same region of the electromotive series of the metals as the fastener alloy. The chosen alloy may be slightly less noble than the fastener alloy in order that such galvanic corrosion as may occur will occur preferentially on the coupon 4 and thus preserve the fastener.

Both the fastener and coupon alloys are chosen to be noble to the alloy of the structure 2. Corrosion of the comparatively small interface 2a between the structure 2 and the fastener 3 is eliminated or severly reduced, at the cost of corrosion of the relatively larger interface 2b between the structure 2 and the coupon 4. Corrosion of this latter interface 2b does not affect the integrity of the fastening.

The shape of the coupon 4 has not been found to be critical, but the area of the coupon 4 is very significant if the desired protection of the critical interface area 2a between the structure 2 and the driven fastener 3 is to be obtained. It has been found that a desirable minimum distance from the driven fastener 3 to the nearest edge of the coupon 4 is about 5 or 6 fastener diameters. Thus for a typical fastener 3 having a diameter of 0.170 inch, the coupon 4 might be round with a radius of about 1 inch, or a 2 inch by 2 inch square, it being understood that the fastener 3 is driven at least $5 \times 0.170 = 0.85$ inch from a coupon edge. To facilitate installation of a large number of fasteners, it may be advantageous to use a long rectangular strip or ribbon, having a minimum width of about 2 inches, along which the fasteners are driven at intervals. Coupon areas up to 2 or 3 times that of the above defined minimum area have been found useful to ensure an adequacy of protective area.

The thickness of the coupon 4 is important only in providing the physical rigidity necessary to maintain the desired contact between the coupon 4 and the structure 2. Thus, coupons having a thickness less than about 0.040–0.080 inch are likely to lose contact because of physical buckling while coupons which were ¼ inch or ½ inch thick give excellent protection but are likely excessively costly for some applications.

It is customary to use a washer 5 in such applications to prevent tearing of the polymeric sheathing 1. The material of which the washer 5 is made should be the same as that used for the protective coupon 4, so that it, too, will neither corrode nor induce corrosion of the fastener 3. The washer 5, per se, however, plays no part in the protection of the fastener-target interface 2a.

In the application illustrated in FIG. 1, the thickness of the target structure 2 is less than 5/16 inch and only a single coupon 4 is used. It has been established, however, that a single coupon, on one target face only, will protect the target-fastener interface for target thicknesses only up to about 5/16 inch. For target thicknesses in excess of about 5/16 inch, it is desirable to employ two protective coupons one on each target face, and both penetrated by the fastener.

Figure 2:
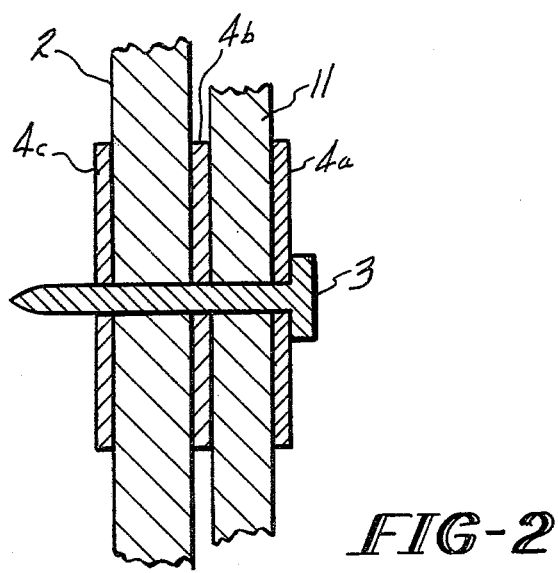
FIG. 2 is a fragmentary cross-sectional view of a second fastener system arranged and constructed in accord with the present invention.

An application employing multiple coupons 4a, 4b and 4c is shown in FIG. 2, wherein a steel saddle 11 for holding a sacrificial anode (not shown) is attached to a steel target structure 2. Both the saddle 11 and the structure 2 have a wall thickness execceding 5/16 inch. The corrosion resistant fastener 3 is driven through an outer coupon 4a, through the wall of the saddle 11, through a second coupon 4b, through the wall of the structure 2, and lastly, through a final coupon 4c.

Regardless of the number of coupons employed, the fastening system of the present invention is employed by establishing intimate contact between the surface of the target structure and the surface of the suitably chosen coupon and driving a corrosion resistant fastener by means of a powder actuated tool, through the coupon and into or through the target structure, thereby establishing intimate contact of the fastener with the coupon and maintaining the intimate contact between the coupon and the target.

An obvious extension of the fastening system herein disclosed is use with corrosion resistant bolts. The holding power of a bolt, however, is procured by the forces exerted by the areas of the bolt head and matching nut; hence corrosion of the annular interfacial area between the body of the bolt and the structure will not destroy the integrity of the fastening. Thus, while a protective coupon, i.e., a large washer made of the same alloy as the bolt, would minimize the corrosion in the interfacial area, it would not necessarily be the critical element in preserving the integrity of the fastening.

It should be noted at all disclosures relative to "marine environments" equally pertain to other corrosive aqueous environments such as obtain in waste disposal, sewerage and chemical plant installations.

While the specific details of the invention have been shown and described herein the invention is not confined thereto as various changes and alterations can be made without departing from the spirit thereof as defined in the appended claims.

We claim:

1. A fastening system for use with a metallic target in a corrosive aqueous environment comprising a metal fastener formed of a corrosion-resistant allow and adapted to be driven by a powder actuated tool, and at least one metal coupon, through which said fastener is driven, said coupon being formed of an alloy which is no more noble, in the galvanic series of metals and alloys, than the alloy of said fastener, but more noble than the alloy of the target.

2. The fastening system of claim 1, wherein the alloy of said fastener is selected from the group of corrosion resistant alloys which are hardenable to a hardness of at least Rockwell C48.

3. The fastening system of claim 1, wherein the alloy of said fastener is more noble, in the galvanic series of the metals, than the alloy of the target.

4. The fastening system of claim 1, wherein the minimum distance between said fastener and the nearest edge of said coupon is approximately five times the diameter of said fastener.

5. The fastening system of claim 1, wherein said coupon has a minimum thickness of about 0.04 inches.

6. A fastening system for use in conjunction with a metallic target immersed in a corrosive aqueous solution, said system comprising a fastener and at least one planar coupon, each formed of a corrosion-resistant metal alloy, said coupon being juxtaposed with the target and maintained in intimate contact therewith by means of said fastener, said fastener piercing said coupon and penetrating the target, said coupon being formed of an alloy which is no more noble, in the galvanic series of metals and alloys, than the alloy of said fastener, but more noble than the alloy of the target.

7. The fastening system of claim 6, wherein the minimum distance between said fastener and the nearest edge of said coupon is approximately five times the diameter of said fastener.

8. The fastening system of claim 6, wherein said coupon has a minimum thickness of about 0.04 inches.

9. A method for obtaining a corrosion-resistant fastening in a metallic target exposed to a corrosive aqueous environment, comprising the steps of:
  a. providing at least one planar metal coupon of a corrosion-resistant alloy, said alloy being more noble, in the galvanic series of metals and alloys, than the target;
  b. providing a metal fastener of a corrosion-resistant alloy, said alloy being at least as noble as the alloy of said coupon, said fastener being adapted to be driven by a powder-actuated tool; and
  c. driving said fastener through said coupon and into the target, said coupon thereby being held in intimate, juxtaposed contact with the target surface.

10. A method of preventing corrosion at the interface between a metallic target and a corrosion resistant fastener driven thereinto, said target and said fastener both being in a corrosive, aqueous environment, comprising the steps of:
  providing a planar coupon of corrosion resistant metal alloy, said alloy being more noble, in the galvanic series, than the alloy of the target, but no more noble than the alloy of said fastener; and staking said coupon to the target by means of said fastener, said coupon being thereby maintained in intimate juxtaposed contact with the target and in contact with said fastener whereby corrosion preferentially occurs at the interface between the target and said coupon.

* * * * *